March 6, 1934.    W. A. MULFORD ET AL    1,950,034
REAR AXLE
Filed June 6, 1932    2 Sheets-Sheet 1
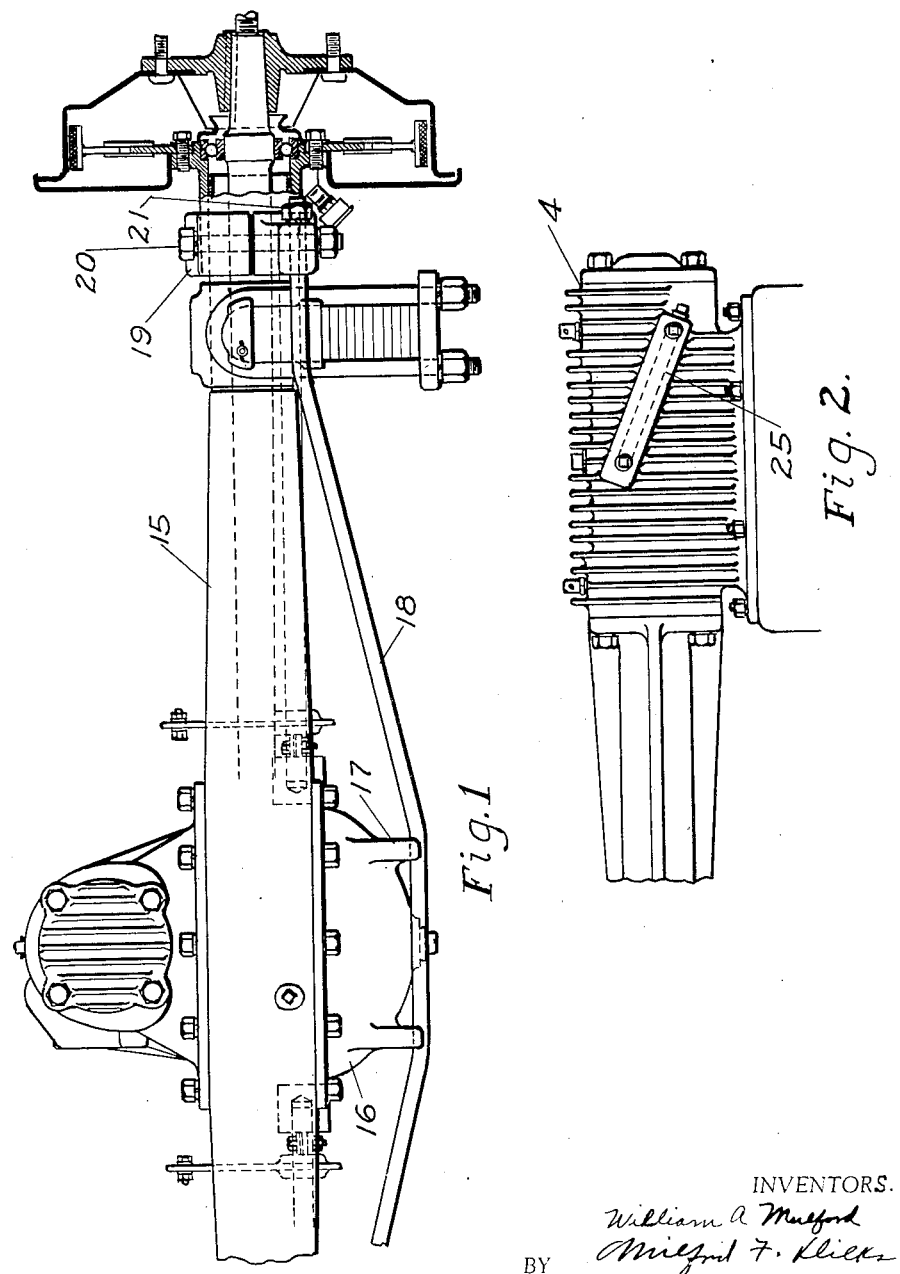
INVENTORS.
William A. Mulford
BY Milfrid F. Klick
Augustus B. Stoughton,
ATTORNEY.

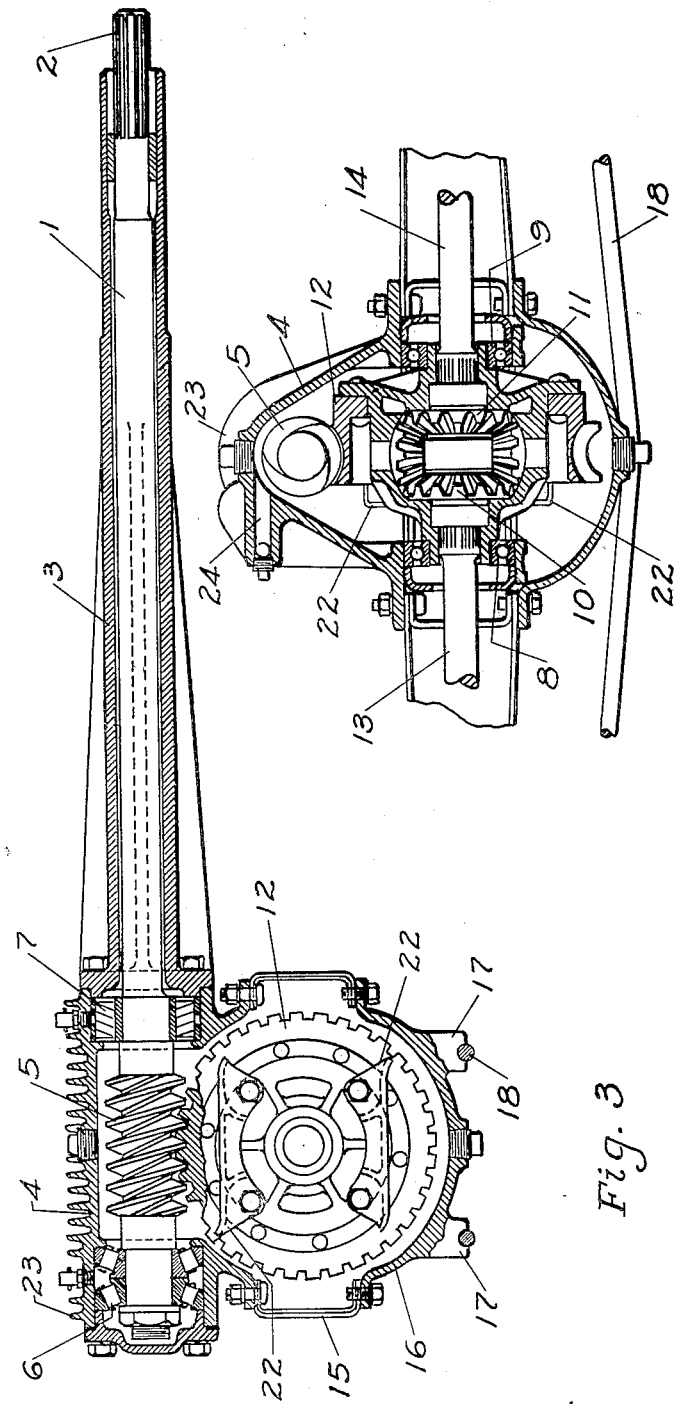

Patented Mar. 6, 1934

1,950,034

UNITED STATES PATENT OFFICE 1,950,034

REAR AXLE

William A. Mulford, Gladwyne, and Milford F. Dilks, Ardmore, Pa.

Application June 6, 1932, Serial No. 615,530

1 Claim. (Cl. 74—99)

The subject of our invention is a rear axle for an automotive vehicle or more particularly a tractor.

More specifically, our invention comprises a rear axle housing of the banjo type in which the banjo housing is mounted horizontally instead of vertically.

Another feature of our invention consists in providing a rear axle in which the torque tube and drive gears may be removed from the banjo housing and from the vehicle as a unit so that the rear end may be worked on at a bench or other convenient location.

Another feature of our invention is to provide truss rods which reenforce the banjo housing.

Still another feature is to provide an oil lubricating system which circulates oil through the worm front and rear thrust bearings.

Still another feature of our invention is to provide fins on the surface of the casing to cool the circulating oil.

For a further exposition of our invention reference may be had to the annexed drawings and specification at the end whereof our invention will be specifically pointed out and claimed.

In the drawings,

Figure 1 is an elevation of a portion of our device looking from the rear with parts in vertical cross section.

Figure 2 is a side view of a portion of our device.

Figure 3 is a vertical cross section, and

Figure 4 is a vertical cross section at right angles to Figure 3.

In that embodiment of our invention, chosen for illustration in the drawings, our device is shown as consisting of a drive shaft 1 having a splined end 2 adapted to be driven. Drive shaft 1 is received in a torque tube 3. The torque tube is connected at its rear end to a worm housing 4. Drive shaft 1 carries at its rear end a worm 5 and is supported adjacent worm 5 by the bearings indicated generally at 6 and 7. Bearings 6 and 7 are suitably supported in housing 4. Housing 4 also supports the bearings indicated in Figure 4 at 8 and 9. These bearings form the supports for the differential gears 10 and 11 and for the worm gear 12. Worm gear 12 is adapted to mesh with worm 5 and to be driven thereby. Worm gear 12 drives axles 13 and 14 in the ordinary differential action. It will thus be seen that the differential gears 10 and 11, the worm gear 12, and the bearings therefore are all supported as a unit from housing 4 and may be removed together with worm 5, drive shaft 1 and torque tube 3 when the housing is disconnected.

Housing 4 is connected at its lower face to a housing 15 of the banjo type which is arranged flatwise or in a horizontal position as opposed to the usual vertical position. At its lower face banjo housing 15 carries a bottom cover which forms the bottom part of the casing surrounding the differential gear structure. Bottom cover 16 carries needleposts 17 thereon. Needleposts 17 serve as bearings for truss rods 18 so that the latter, together with the banjo housing 15, form a truss of great strength. The truss rods 18 are attached to the banjo housing 15 at their outer ends by means of clamps 19 which are clamped together by bolts 20. The ends of rods 18 pass through the clamps 19 and receive at their outer ends nuts 21 which fasten the truss rods 18 securely to the banjo housing 15.

As is best seen in Figures 3 and 4, worm gear 12 carries oil scoops 22 on one side surface. These oil scoops dip into the oil in the bottom of the housing and throw it upward into the interior of worm housing 4. Worm housing 4 carries fins 23 on its outer surface so that the heat in the oil is readily radiated from the surface of the housing. At its upper end worm housing 4 has an oil passage 24 which communicates with a lateral oil passage 25 which transfers the oil from the chamber surrounding worm 5 to the chambers of bearings 6 and 7 whence the oil works its way through bearings 6 and 7 and falls again into the interior of the housing. Oil is thus circulated through the worm bearings. The worm 5 acts as an oil pump and aids in this circulation of the oil through the oil passages 24 and 25.

We do not intend to be limited in the practice of our invention save as the scope of the prior art and of the attached claim may require.

We claim:

In a rear axle for a motor vehicle, a drive shaft, a worm on said drive shaft, a worm gear cooperating with said worm, a worm housing surrounding said worm, differential gears driven by said worm gear, a housing surrounding said worm gear and said differential gears, means for circulating oil from said housing into said worm housing, means for returning oil from said worm housing to said second mentioned housing, and fins integral with said worm housing for cooling said circulating oil.

WILLIAM A. MULFORD.
MILFORD F. DILKS.